July 16, 1957 N. R. PELLETIER 2,799,174
POWER TOOL REVERSIBLE SPROCKET WHEEL
Filed April 13, 1956
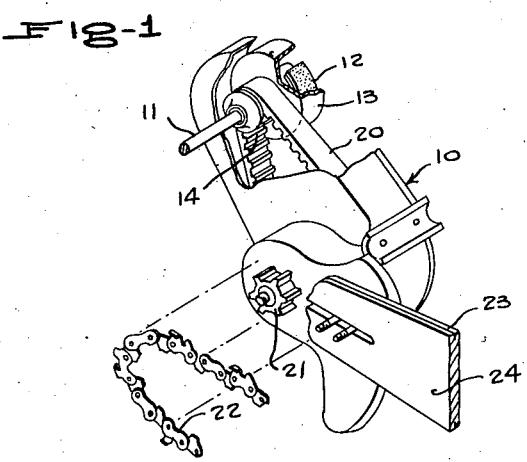
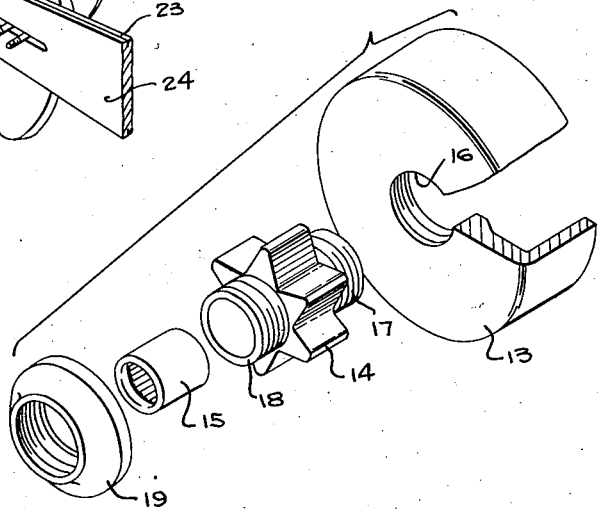
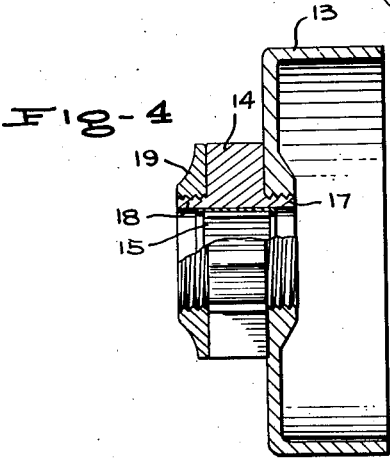
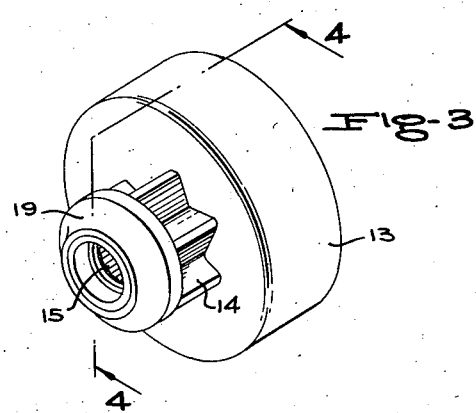
INVENTOR.
NORMAND R. PELLETIER
BY
McMorrow, Berman & Davidson
ATTORNEYS

United States Patent Office 2,799,174
Patented July 16, 1957

---

2,799,174

POWER TOOL REVERSIBLE SPROCKET WHEEL

Normand R. Pelletier, Fort Kent, Maine

Application April 13, 1956, Serial No. 577,975

2 Claims. (Cl. 74—216.5)

The present invention relates to a power tool generally and in particular to a reversible sprocket wheel for attachment to the clutch drum of a power tool.

An object of the present invention is to provide a sprocket wheel for the clutch drum of a power tool which lends itself to long wear and inexpensive replacement when worn, one which may be reversed when worn on one side so that its length of useful life may be doubled, and one which is sturdily built and may be economically manufactured and assembled.

These and other objects and advantages of the present invention will be fully apparent from the following description when taken in connection with the annexed drawing, in which:

Figure 1 is a perspective view of a portion of a power saw of the portable type, showing a portion of the casing and the friction clutch drum broken away and the cutting chain portion of the power saw in fragmentary exploded view;

Figure 2 is an exploded view of the components of the present invention;

Figure 3 is an assembled view of the components of the present invention; and

Figure 4 is a sectional view taken on the line 4—4 of Figure 3.

Referring in greater detail to the drawing, in which like numerals indicate like parts throughout the several views, a power tool, such as the portion of a portable power saw indicated generally in Figure 1 by the reference numeral 10, has a rotatable drive shaft 11 and a friction clutch shoe 12 carried by the drive shaft 11 for movement therewith. The present invention provides a friction clutch drum 13 which is circumposed about the clutch shoe 12 and is engageable by the latter when the drive shaft 11 rotates at a higher speed than idling.

The sprocket wheel 14 is arranged on the side of the drum 13 remote from the clutch shoe 12 and is circumposed about the portion of the drive shaft 11 which is exteriorly of the drum 13. As shown in Figure 2, a needle bearing assembly 15 is insertable within the sprocket wheel 14 between the latter and the adjacent portion of the drive shaft 11.

Attaching means is provided on the drum 13 and cooperating attaching means is provided on each face of the sprocket wheel 14 for selectively securing the sprocket wheel 14 with either of its faces in abutting relationship with respect to the exterior faces of the drum 13. While the attaching means on the drum and the cooperating attaching means on the sprocket wheel 14 may consist in any means for securement of the two elements together, the preferable means consists in a centrally disposed threaded aperture, indicated in Figure 2 by the reference numeral 16, in the drum 13, and a threaded hub 17 on one face of the sprocket wheel 14 and another threaded hub 18 on the other face of the sprocket wheel 14.

As shown in Figure 3, the one hub 17 closest to the drum 13 is threadedly received within the aperture 16, the direction of the threads being such that upon rotation of the drive shaft 11 and subsequent rotation of the drum 13, the sprocket wheel 14 is tightened upon the drum 13.

A protective nut 19 is provided for protecting the threads on the one hub 18 which is remote from the drum 13 until such time that it is desirable to reverse the sprocket wheel 14 and to engage the hub 18 in the aperture 16. This reversal of the sprocket wheel 14 is necessary when the power saw drive chain 20 has worn the sprocket wheel 14 to the point where slippage occurs or further use of the sprocket wheel in the one position will cause damage to the drive chain 20. Preferably, the diameter of the nut 19 is greater than or at least equal to the diameter of the sprocket wheel 14 to serve as a guide for the drive chain 20.

The power saw 10 includes a driven sprocket gear 21 driveably engageable by the drive chain 20 and engaging the cutting chain 22 for effecting the traveling movement of the latter in the guideways 23 provided in the saw arm 24.

It will be seen, therefore, that whenever excessive wear has occurred to the sprockets of the sprocket wheel 14, the latter may be removed from its securement to the drum 13 and reversed so that twice the length of life may be expected from a sprocket wheel constructed according to the present invention.

What is claimed is:

1. In a power tool, the combination with a rotatable drive shaft and a friction clutch shoe carried by said drive shaft for movement therewith, of a clutch drum circumposed about said clutch shoe and engageable with the latter, a sprocket wheel arranged on the side of said drum remote from said clutch shoe, attaching means on said drum, and cooperating attaching means on each face of said wheel, one of the attaching means of said wheel being secured to said drum attaching means.

2. In a power tool, the combination with a rotatable drive shaft and a friction clutch shoe carried by said drive shaft for movement therewith, of a clutch drum circumposed about said clutch shoe and engageable with the latter, a sprocket wheel arranged on the side of said drum remote from said clutch shoe, attaching means on said drum, and cooperating attaching means on each face of said wheel, one of the attaching means of said wheel being secured to said drum attaching means, said attaching means on said drum embodying a centrally disposed threaded aperture and each of said attaching means on said wheel embodying a threaded hub selectively threadedly receivable in said drum aperture.

References Cited in the file of this patent

UNITED STATES PATENTS

| | | |
|---|---|---|
| 2,474,728 | Doran | June 28, 1949 |
| 2,552,747 | Strimple | May 15, 1951 |
| 2,723,523 | Baierlein | Nov. 15, 1955 |